US005205989A

United States Patent [19]

Aysta

[11] Patent Number: 5,205,989

[45] Date of Patent: Apr. 27, 1993

[54] MULTI-WELL FILTRATION APPARATUS

[75] Inventor: James E. Aysta, Stillwater, Minn.

[73] Assignee: Minnesota Mining and Manufacturing Company, St. Paul, Minn.

[21] Appl. No.: 761,433

[22] Filed: Sep. 18, 1991

[51] Int. Cl.⁵ ............ B01D 35/30

[52] U.S. Cl. ............ 422/101; 210/323.2; 210/406; 422/102; 422/104; 435/311

[58] Field of Search ............ 422/101, 102, 104; 435/311; 210/323.2, 406

[56] References Cited

U.S. PATENT DOCUMENTS

| | | | |
|---|---|---|---|
| 3,730,352 | 5/1973 | Cohen et al. | 210/332 |
| 3,888,770 | 6/1975 | Avital et al. | 210/238 |
| 4,154,795 | 5/1979 | Thorne | 422/99 |
| 4,246,339 | 1/1981 | Cole et al. | 422/101 |
| 4,427,415 | 1/1984 | Cleveland | 436/57 |
| 4,526,690 | 7/1985 | Kiovsky et al. | 422/101 |
| 4,642,220 | 2/1987 | Björkman | 422/101 |
| 4,704,255 | 11/1987 | Jolley | 422/101 |
| 4,734,192 | 3/1988 | Champion et al. | 422/101 |
| 4,777,021 | 10/1988 | Wertz et al. | 422/101 |
| 4,787,988 | 11/1988 | Bertoncini | 435/313 X |
| 4,828,386 | 5/1989 | Matkovich et al. | 356/246 |
| 4,902,481 | 2/1990 | Clark et al. | 422/101 |
| 4,948,442 | 8/1990 | Manns | 156/73.1 |
| 5,035,861 | 7/1991 | Grandone | 422/64 |
| 5,108,603 | 4/1992 | Schuette | 210/321.72 |
| 5,112,488 | 5/1992 | Lemonnier | 422/101 X |

OTHER PUBLICATIONS

Life Technologies, Inc., product literature for The Convertible TM Filtration Manifold System Life Technologies, Inc., advertisement in BioTechniques, v. 11, n. 6 (Dec. 1991).

*Primary Examiner*—Jill A. Johnston

*Attorney, Agent, or Firm*—Gary L. Griswold; Walter N. Kirn; Karl G. Hanson

[57] ABSTRACT

A multi-well filtration apparatus is provided that has a housing, a multi-well filtration plate, and a pivotable member. The pivotable member secures the multi-well filtration plate to the housing and is associated with a resilient member. When the multi-well filtration plate is pressed against the pivotable member, it pivots, and the resilient member compresses to allow the pivotable member to instantaneously engage the multi-well filtration plate to secure it to the housing. The pivotable member can quickly release the multi-well filtration plate by simply exerting a force on a surface of the pivotable member.

20 Claims, 4 Drawing Sheets

MULTI-WELL FILTRATION APPARATUS

TECHNICAL FIELD

This invention pertains to a filtration apparatus that has a filter holder which can be quickly secured to a housing of the filtration apparatus. More particularly, this invention pertains to a multi-well filtration apparatus that has a multi-well filtration plate which can be quickly secured to a housing of the apparatus and can be quickly removed therefrom.

BACKGROUND OF THE INVENTION

Multi-well filtration apparatus are well known in the art, and are used for the assay of biological liquids. Examples of such apparatus are disclosed in U.S. Pat. Nos. 5,035,861, 4,948,442, 4,902,481, 4,828,386, 4,777,021, 4,734,192, 4,704,255, 4,642,220, 4,526,690, 4,427,415, 4,246,339, and 4,154,795, and in U.S. patent application Ser. No. 07/671,448, filed Mar. 19, 1991.

Known multi-well filtration apparatus typically comprise a multi-well filtration plate and a housing. A conventional multi-well filtration plate has 96 wells for performing multiple assays simultaneously. Each well typically contains a filter for separating a biological component from the liquid that is introduced into the apparatus. Typically, the housing will receive the filtrate that passes through the filter in each well. A vacuum chamber is usually provided in the housing for drawing the liquid through each filter.

Frequently, there are occasions when a multitude of samples need to be tested in a multi-well filtration apparatus. When these occasions arise, it becomes necessary to use a number of multi-well filtration plates, which have to be secured to and removed from the housing of the apparatus.

In previously-developed multi-well filtration apparatus, the multi-well filtration plate has been secured to the housing in a manner that does not promote quick and convenient removal of the multi-well filtration plate.

For example, in U.S. Pat. No. 4,427,415 a multi-well filtration plate is secured to a housing by a pair of retaining brackets and retaining bolts. The multi-well filtration plate is held beneath a projecting flange of the retaining bracket. The retaining bolts pass through the brackets into the housing and are tightened to secure the multi-well filtration plate to the housing. To remove the multi-well filtration plate, the bolts need to be loosened to disengage the brackets from the multi-well filtration plate. The multi-well filtration plate can then be removed from beneath the brackets. When a number of samples need to be tested, this becomes a relatively inefficient and time-consuming task for the user of this multi-well filtration apparatus.

In U.S. patent application Ser. No. 07/671,448, the multi-well filtration plate is attached to the housing by placing a bracket over the plate and closing two latches that are attached to the bracket. To remove the multi-well filtration plate from the housing of the apparatus of U.S. patent application Ser. No. 07/671,448, each latch must be opened, and the bracket must be removed from the housing. This is a time-consuming task and is a hassle to the user of the apparatus, particularly when many samples are being tested.

SUMMARY OF THE INVENTION

The present invention provides a multi-well filtration apparatus, which permits the multi-well filtration plate to be quickly and conveniently secured to and removed from the housing. The multi-well filtration apparatus of this invention comprises: (a) a housing; (b) a multi-well filtration plate having a plurality of wells that each have a filter located therein; and (c) a means for securing the multi-well filtration plate to the housing, the securing means permitting the multi-well filtration plate to be secured to the housing by pressing the multi-well filtration plate against a pivotable member of the securing means. The multi-well filtration apparatus also has a means for quickly releasing a multi-well filtration plate from the housing. The quick releasing means operates in response to a force exerted on a surface of the pivotable member.

Thus, an object of the invention is to provide a new and improved multi-well filtration apparatus that allows the multi-well filtration plate to be quickly secured to and removed from the apparatus' housing.

This and other objects and novel features of the invention are more fully shown and described in the drawings and the following detailed description of this invention, where like reference numerals are used to designate similar parts. It is to be expressly understood, however, that the drawing and description are for the purpose of illustration only. They should not be read in a manner that would unduly limit the scope of this invention.

DETAILED DESCRIPTION OF PREFERRED EMBODIMENTS

In describing preferred embodiments of this invention, specific terminology will be used for the sake of clarity. It is to be understood, however, that each specific term so selected includes all the technical equivalents that operate similarly.

Figure 1:
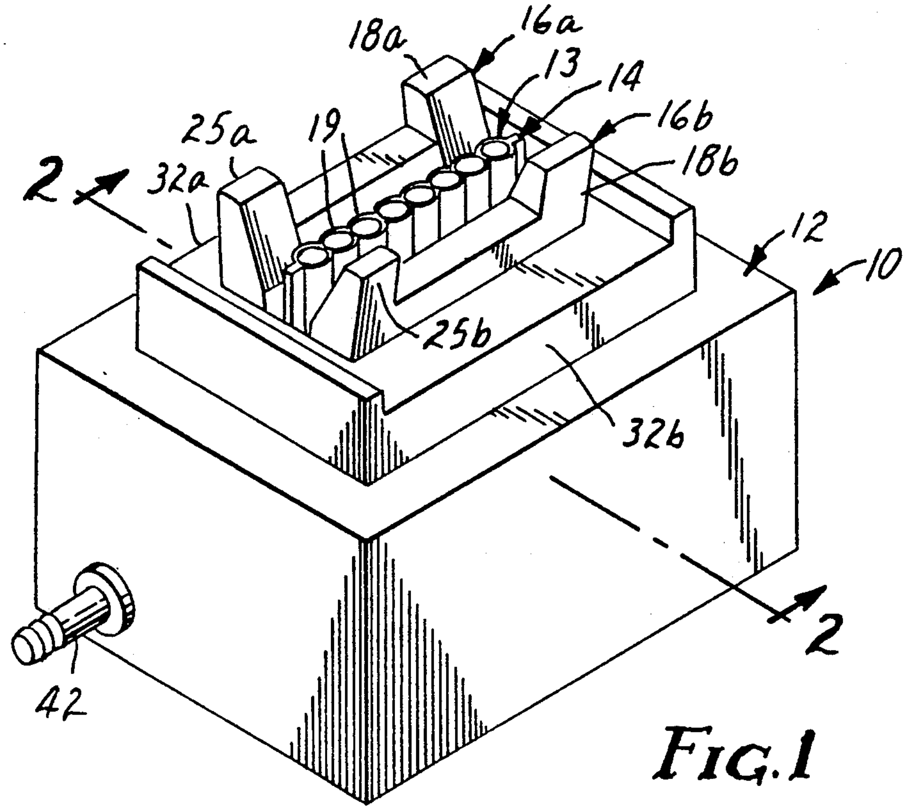
FIG. 1 is a perspective view of a multi-well filtration apparatus 10 in accordance with the present invention. The multi-well filtration apparatus 10 shown here has an eight well filtration plate 14.

Referring first to FIG. 1, multi-well filtration apparatus 10 is shown. Multi-well filtration apparatus 10 includes housing 12, means 13 for retaining at least one filter, and means **16*a*, 16*b*** for securing the filter retaining means 13 to housing 12. Means 13 for retaining at least one filter can be a multi-well filtration plate 14.

Multi-well filtration plate, as the name implies, is a filtering part that contains a plurality of wells 19. Typically, the number of wells in a multi-well filtration plate is a multiple of eight—with eight well and ninety-six well filtration plates being more common.

Figure 2:
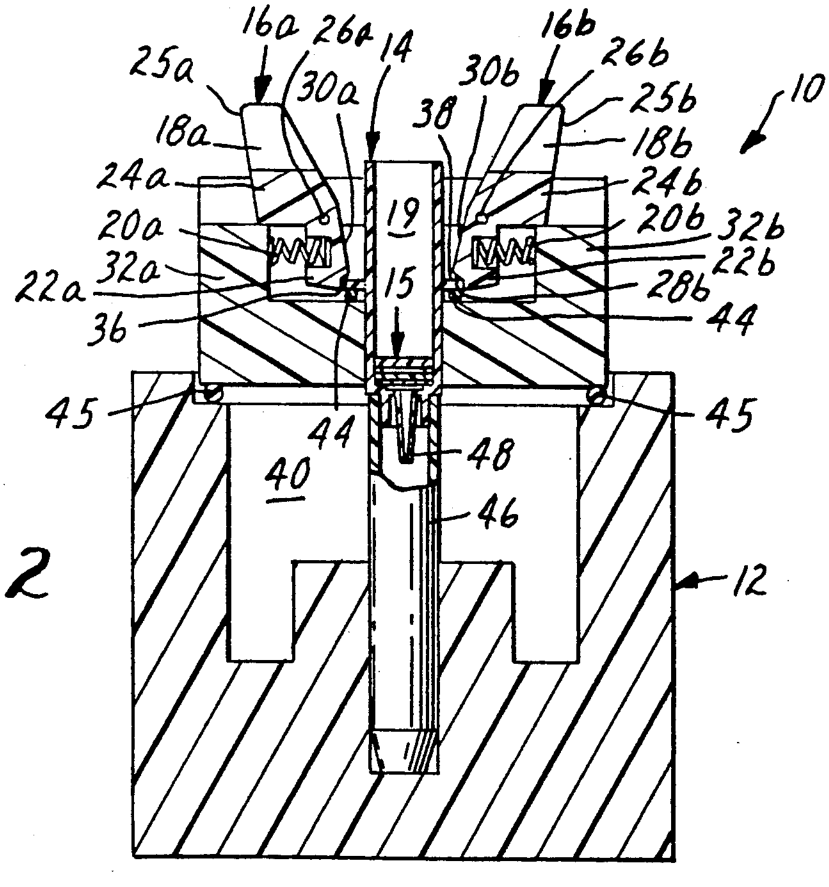
FIG. 2 is a cross-section of the apparatus 10 of FIG. 1 taken along lines 2—2.
Figure 3:
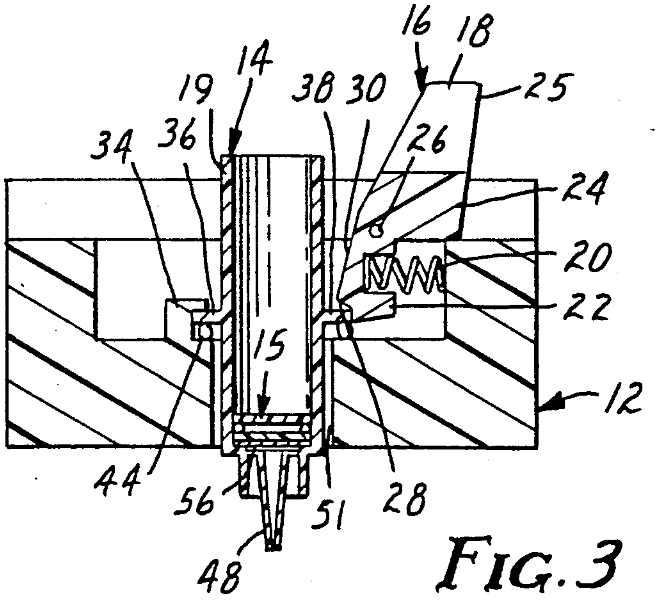
FIG. 3 is an alternative embodiment of a multi-well filtration apparatus in accordance with the present invention.

In FIGS. 1–3, there is shown apparatus 10 having a multi-well filtration plate 14 that contains eight wells 19, where each well 19 contains a filter 15. The eight-well filtration plate 14 is secured to housing 12 by securing means 16a, 16b making contact with flanges 36 and 38.

Figure 4:
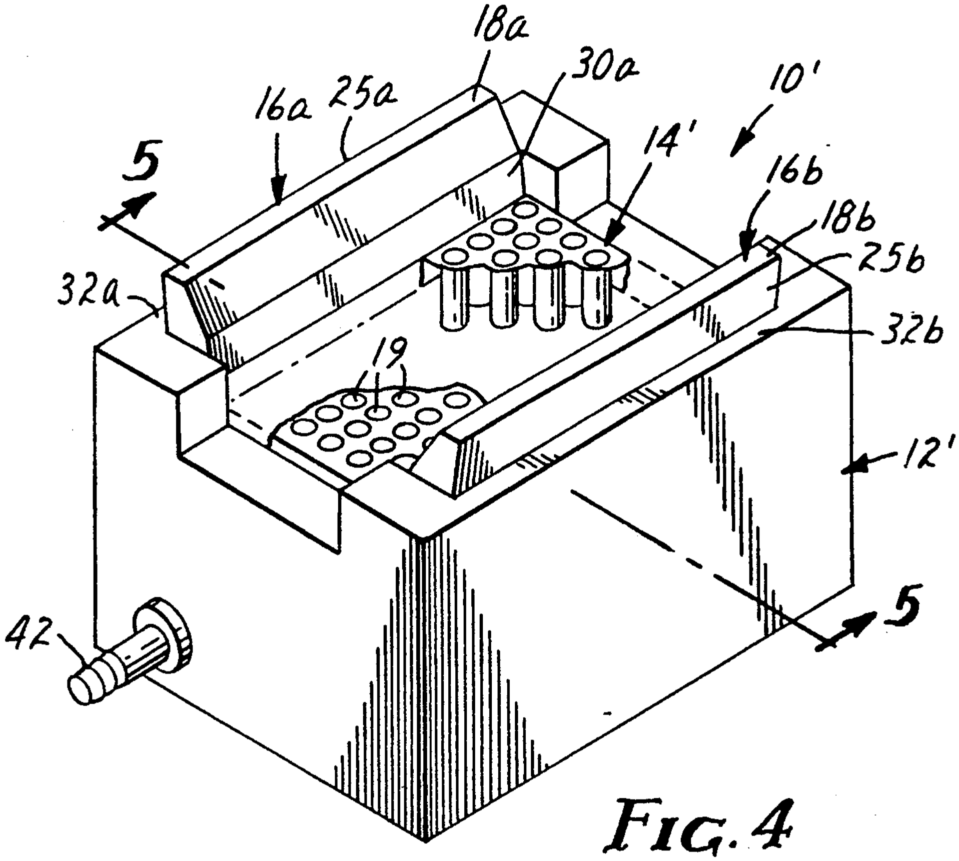
FIG. 4 is a perspective view of a multi-well filtration apparatus 10' in accordance with the present invention. The multi-well filtration apparatus shown here has a ninety-six well filtration plate 14'.
Figure 5:
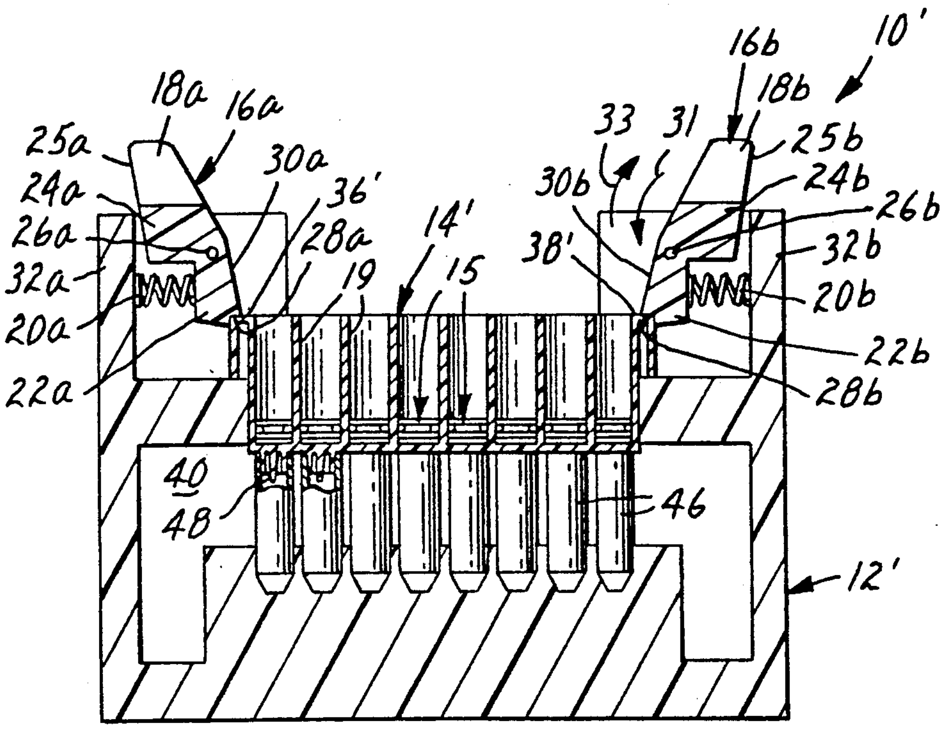
FIG. 5 is a cross-section of FIG. 4 taken along lines 5—5.

In FIGS. 4 and 5, apparatus 10' is shown that contains a multi-well filtration plate 14' that has ninety-six wells 19 each having a filter 15 located therein. Multi-well filtration plate 14' is secured to housing 12' by having securing means 16a, 16b make contact with flanges 36' and 38'.

Apparatus 10' operates similarly to apparatus 10. For example, apparatus 10 and 10' have similar means 16a, 16b for securing the multi-well filtration plate to housing 12 and 12', respectively. Accordingly, the following description will be directed to apparatus 10; however, it will be understood that what is said pertaining to apparatus 10 of FIG. 1–3 can, for all practical purposes, be applied to apparatus 10' of FIGS. 4 and 5. Means 16a and 16b, of apparatuses 10 and 10' is best shown in FIG. 7 and will be described in that figure and the others with the use of the same identifying numerals, and each noted part embodied in means 16a and 16b will be identified by a numeral having the letters "a" or "b" placed thereafter to indicate which securing means 16a or 16b the so-identified part corresponds to in the figures.

Figure 7:
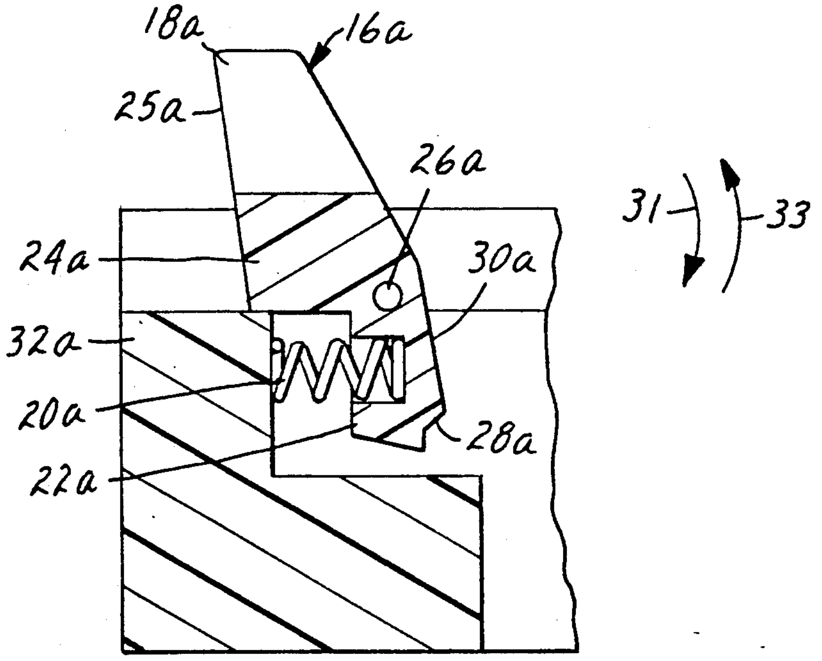
FIG. 7 is an enlarged view of a means **16*a*** for securing a multi-well filtration plate to an apparatus housing in accordance with the present invention.

With reference to FIGS. 1, 2, and 7, a multi-well filtration plate 14 can be instantaneously secured to an apparatus' housing 12 by pressing the multi-well filtration plate 14 against means 16a and 16b for securing the multi-well filtration plate to the housing. Means 16a, 16b each have, as best shown in FIGS. 2, a movable member such as pivotable member 18a, 18b. Pivotable member 18a, 18b each have a first portion 22a, 22b and a second portion 24a, 24b. Each first portion 22a, 22b, includes a surface 28a, 28b that forces multi-well filtration plate 14 into a secured position. Each second portion 24a, 24b includes surface 25a, 25b for receiving a force that causes securing means 16a, 16b to disengage the multi-well filtration plate 14.

Each securing means 16a, 16b is shown to have a resilient means 20a and 20b. Resilient means 20a, 20b preferably is a compressed coil spring. Resilient means 20a, 20b exerts a force on the multi-well filtration plate 14 to hold multi-well filtration plate 14 in a secured position.

Securing means 16a, 16b each also include guiding surface 30a, 30b, surface 28a, 28b that forces the multi-well filtration plate 14 towards housing 12, axis 26a or 26b, and supporting wall 32a, 32b. Guiding surface 30a, 30b and surface 28a, 28b that forces multi-well filtration plate 14 towards housing 12 are both located on pivotable members 18a, 18b. Pivotable members 18a, 18b each pivot about axis 26a, 26b such as a pin when multi-well filtration plate 14 is pressed against guiding surface 30a, 30b. Flanges 36 and 38 of multi-well filtration plate 14 preferably make contact with guiding surface 30a, 30b when the multi-well filtration plate 14 is pressed against pivotable members 18a, 18b. This causes pivotable member 18a, 18b to pivot in a first direction 31 (shown in FIGS. 5 and 7) so that securing means 16a, 16b opens permitting multi-well filtration plate 14 to make contact with surface 28a, 28b that holds the multi-well filtration plate 14 in a secured position. The opening of securing means 16a, 16b occurs progressively as multi-well filtration plate 14 is pressed towards housing 12. Securing means 16a, 16b instantaneously closes when the forces from flanges 36 and 38 reach the end of guiding surface 30a, 30b.

Each resilient means 20a, 20b extends from supporting wall 32a, 32b to pivotable member 18a, 18b to provide a force that causes pivotable member 28a, 28b to pivot in second direction 33 (shown in FIGS. 5 and 7). A force from each resilient means 20a, 20b is transferred to surface 28a, 28b to secure multi-well filtration plate 14 to apparatus 10. Surfaces 28a, 28b overlap first and second flanges 36 and 38 of multi-well filtration plate 14 when the latter is held in a secured position. Flanges 36 and 38 preferably project laterally from plate 14 in opposite directions and are fixed thereto or integral therewith.

Multi-well filtration plate 14 can be quickly disengaged from the securing means 16a and 16b. This can be accomplished by exerting a force against surface 25a and/or 25b. When a force is exerted against surface 25a, 25b, pivotable member 18a, 18b will pivot in first direction 31 causing resilient means 20a, 20b to compress. When the pivotable member 18a, 18b has pivoted to an extent that surface 28a, 28b no longer overlaps or makes contact with first and second flanges 36 or 38, multi-well filtration plate 14 can be removed from apparatus 10, respectively.

Turning now to FIG. 3, an alternative embodiment is illustrated. As opposed to the embodiments shown in FIGS. 1, 2, 4, and 5, a multi-well filtration apparatus of this alternative embodiment can only need one pivotable member to secure a multi-well filtration plate 14 or 14' to a housing 12 or 12'. This can be accomplished, for example, as shown in FIG. 3 by providing a multi-well filtration apparatus with a stationary retaining means such as an L-shaped flange 34 fixed to or integral with housing 12. Stationary L-shaped flange 34 retains first edge 36 of multi-well filtration plate 14. Pivotable member 18 retains second edge 38 of multi-well filtration plate 14 and can have a similar structure and operation as members 18a, 18b described above. Multi-well filtration plate 14, in this embodiment, can be instantaneously secured to housing 12 by pressing second flange 38 towards the housing 12 along guiding surface 30 and then inserting first flange 36 beneath the stationary flange 34. Pressing flange 38 against guiding surface 30 causes securing means 16 to open to receive the multi-well filtration plate 14. In a secured position, surface 28 forces second flange 38 of multi-well filtration plate 14 into a secured position. Pivotable member 18 can be quickly disengaged as described above.

In order to allow multi-well filtration plate 14 to be secured to housing 12, opening 51 in housing 12 needs to be larger than multi-well filtration plate in the cross-sectional direction. The cross-section of opening 51, as shown in FIG. 3, needs to be at least greater than the overlap of flange 36 with L-shaped flange 34. This will allow flange 38 to be pressed against surface 30 causing member 18 to pivot and will allow flange 36 to be placed beneath L-shaped flange 34 to secure plate 14 to housing 12.

As best shown in FIGS. 2 and 5, housing 12 or 12' can contain vacuum chamber 40 for drawing liquid through filter 15 of multi-well filtration plate 14 or 14'. Vacuum chamber 40 operates in communication with a vacuum source (not shown) and with a vacuum hose (not shown) connected to male member 42 shown in FIGS. 1 and 4. Vacuum hose draws a partial vacuum in vacuum chamber 40 causing the liquid in wells 19 to be drawn through filter 15. Gaskets 44 and 45 are provided in multi-well filtration apparatus 10 and 10' to maintain an airtight seal. Gaskets 44 and 45 are preferably made of a resilient material such as a standard rubber like a nitrile rubber.

Although housing 12' shown in FIGS. 4 and 5 has a "one-piece" housing, the term "housing" as used in here is not intended to be limited to such. It is intended that the term housing will include any means or any base for supporting a means for retaining at least one filter (e.g. multi-well filtration plate). A housing therefore may include a two-piece construction as shown in FIGS. 1 and 2 and can have a plurality of plates, gaskets, and other means to assist in carrying out a filtration.

Housing 12, 12' may be made from any suitable material, preferably a clear plastic such as an acrylic or a polycarbonate. The material selected will, of course, depend on the nature of the liquids to be processed in the apparatus.

Figure 6:
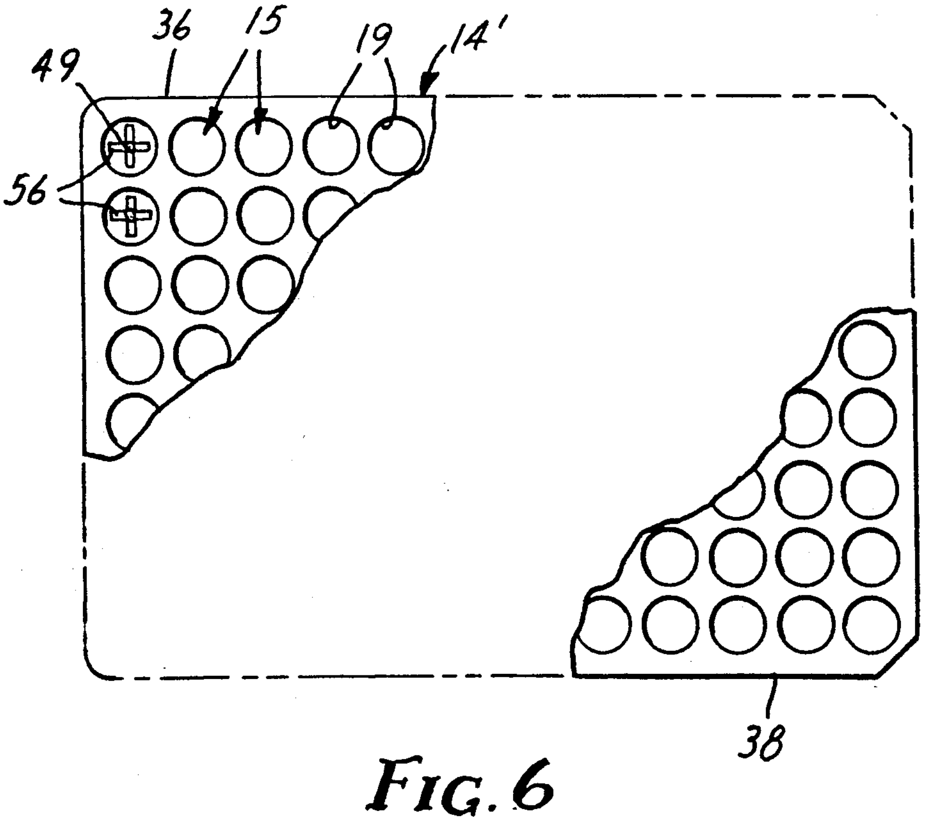
FIG. 6 is a partial top view of a ninety-six well filtration plate.

The multi-well filtration plate can be fabricated from suitable materials similar to those used to make the housing. An example of a ninety-six well filtration plate 14' is illustrated in FIG. 6. Filtration plate 14' contains a plurality of wells 19 having filters 15 placed at the bottom of each well 19. Filters 15 are removed from two of the wells to show the channels 56 that direct the filtrate to outlet spout 48. Outlet spout 48, preferably, has a tapered orifice 49.

As shown in FIGS. 2 and 5, collecting containers 46 can be provided in housing 12 or 12' to collect a filtrate from outlet spouts 48. A single collecting container 46 can be located beneath a single well 19 to collect the filtrate from that particular well. Conical outlet spout 48 that extends into the confines of conical container 46 to prevent cross-filtrate-communication between adjacent collecting containers. This method of preventing cross-filtrate-communication is disclosed in U.S. patent application Ser. NO. 07/671,448. The disclosure of that patent application is incorporated here by reference.

Figure 8:
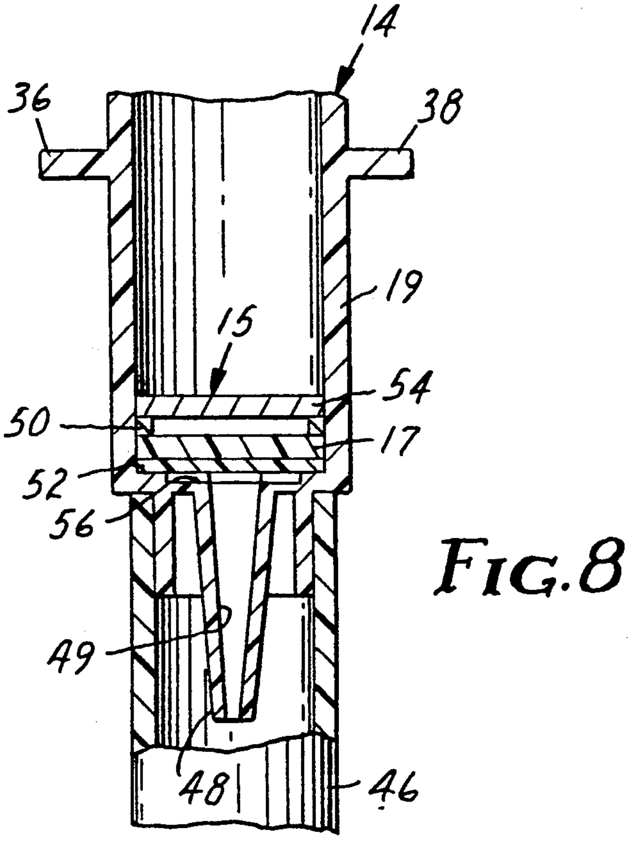
FIG. 8 is an enlarged cross-sectional view of a multi-well filtration plate 14.

Filter 15 shown in FIG. 8 can be any filter suitable for the application at hand. The term "filter", although used singularly in here, can include a plurality of filters or layers. For example, in a preferred embodiment filter 15 can include a filtering medium 17 such as a polytetrafluoroethylene fibril matrix having nonswellable sorptive particles enmeshed in the matrix. Such a filter is disclosed in U.S. Pat. Nos. 4,810,381 and 4,699,717 and is marketed by the 3M Corporation under the trademark EMPORE. Filtering medium 17 can be held in position by a retaining ring 50. Above retaining ring 50, there can be a prefilter 54 such as a high density, porous polyethylene fine sheet (available from Porex Corp., Fairburn, Ga). Prefilter 54 can remove the relatively larger particles in the filtered liquid to prevent filter clogging and to facilitate flow of the liquid through the filter. Between fibril matrix 17 and the bottom of well 19, there can be placed porous material 52 such as a porous nonwoven polypropylene membrane (available from Veratec Data Resource Group, Westwood, Mass. material type 141—583).

This invention may take on various modifications and alterations without departing from the spirit and scope thereof. Accordingly, it is to be understood that this invention is not to be limited to the above-described, but is to be controlled by the limitations set forth in the following claims and any equivalents thereof. It is also to be understood that this invention may be suitably practiced in the absence of any element not specifically disclosed herein.

What is claimed is:

1. A multi-well filtration apparatus, which comprises:

(a) a housing;

(b) a multi-well filtration plate having a plurality of wells that each have located therein; and (c) attached to the housing a means for securing the multi-well filtratic to the housing, the securing means including at least one pivotable member and permitti multi-well filtration plate to be secured to the housing by pressing the multi-well filtration against the at least one pivotable member of the securing means.

2. The multi-well filtration apparatus of claim 1, wherein the securing means has a resilient means that exerts a force upon the multi-well filtration plate to hold the multi-well filtration plate in a secured position, the resilient means permitting the multi-well filtration plate to be snapped into securement.

3. The multi-well filtration apparatus of claim 1, wherein the securing means includes a resilient means and the pivotable member has first and second portions that are pivotable about an axis, the resilient means acting upon the first and second portions, the first portion having a surface that forces the multi-well filtration plate into a secured position, the second portion having a surface for receiving a force that causes the securing means to disengage the multi-well filtration plate.

4. The multi-well filtration apparatus of claim 1, wherein the securing means includes: a first guiding surface and a second surface that forces the multi-well filtration plate towards the housing; a resilient means; an axis; and a supporting wall;

the first guiding surface and the second surface that fores the filter retaining means towards the housing both being located on the pivotable member which pivots about the axis, the guiding surface making contact with the multi-well filtration plate when the multi-well filtration plate is pressed against the pivotable member causing the pivotable member to pivot in a first direction so that the multi-well filtration plate can make contact with the second surface that holds the multi-well filtration plate in a secured position, the resilient means being located between the supporting wall and the pivotable member to provide a force that is transferred to the second surface to secure the filtering retaining means.

5. The multi-well filtration apparatus of claim 1, wherein the securing means has a stationary flange for retaining a first flange of the multi-well filtration plate, the pivotable member retaining a second flange of the multi-well filtration plate, there being a resilient means that allows the pivotable member to pivot (1) in a first direction in response to a force from the multi-well filtration plate so that the securing means can receive the second flange of the multi-well filtration plate, and to pivot (2) in a second direction to instantaneously secure the multi-well filtration plate.

6. The multi-well filtration apparatus of claim 1, wherein the securing means include first and second pivotable members for receiving first and second opposite flanges of the multi-well filtration plate, respectively, there being first and second resilient means associated with the first and second pivotable members to allow the securing means to pivot in a first direction in response to a force from the multi-well filtration plate so that the securing means can receive the first and second opposing flanges, respectively, of the multi-well filtration plate, and to pivot in a second direction to instantaneously secure the multi-well filtration plate to the housing.

7. The multi-well filtration apparatus of claim 6, wherein the first and second pivotable members each have first and second surfaces that force the multi-well filtration plate towards the housing, the first and second surfaces overlapping the first and second opposing flanges when the multi-well filtration plate is secured to the housing.

8. The multi-well filtration apparatus of claim 1, wherein the securing means progressively opens in response to a force from the multi-well filtration plate, the progressive opening occurring as the multi-well filtration plate is pressed against a surface of the pivotable member towards the housing.

9. The multi-well filtration apparatus of claim 1, further comprising a means for quickly releasing the multi-well filtration plate from the housing, the quick releasing means operating by exerting a force on a surface of the pivotable member.

10. The multi-well filtration apparatus of claim 1, wherein the housing has a vacuum chamber, the vacuum chamber assisting in drawing liquid through the filters in the wells of the multi-well filtration plate, the multi-well filtration plate being secured to the housing by the securing means such that an air-tight fit is maintained along edges of the multi-well filtration plate, the air-tight fit being maintained by a force from the pivotable member.

11. A multi-well filtration apparatus, which comprises:

(a) a housing having a vacuum chamber;

(b) a means for retaining at least one filter; and attached to the housing (c) a means for securing the filter retaining means to the housing, the filter retaining means being secured to the housing such that the vacuum chamber can draw liquid therethrough, the securing means having a movable member and a resilient means, which movable member and resilient means allow the securing means to open in response to a force from the filter retaining means to receive the filter retaining means, and to close to instantaneously secure the filter retaining means to the housing.

12. The multi-well filtration apparatus of claim 11, wherein the filter retaining means instantaneously snaps into a secured position on the housing by pressing the filter retaining means against the movable member of the securing means.

13. The multi-well filtration apparatus of claim 11, wherein the movable member has: a means for guiding the filter retaining means into a secured position; and a surface that forces the filter retaining means towards the housing.

14. The multi-well filtration apparatus of claim 12, wherein the movable member of the securing means includes a guiding surface, the securing means progressively opens in response to a force from the filter retaining means, the progressive opening of the securing means occurring as the force from the filter retaining means moves along the guiding surface towards the housing, the securing means closes as that force reaches the end of the guiding surface.

15. The multi-well filtration apparatus of claim 14, wherein the securing means includes a pivotable member with first and second portions that extend radially from an axis, the first portion having the guiding surface and the surface that forces the filter retaining means towards the housing located thereon, the second portion having a surface for receiving a force that causes the securing means to disengage the filter retaining means.

16. The multi-well filtration apparatus of claim 11, wherein the movable member pivots in a first direction about an axis in response to a force from the filter retaining means to open the securing means, and, when the securing means has opened to an extent sufficient to receive the filter retaining means, the movable member instantaneously pivots in a second direction to engage the filter retaining means.

17. The multi-well filtration apparatus of claim 11, wherein the resilient means exerts a force on the filter retaining means during securement, that force being able to be removed to disengage the filter retaining means from the housing by exerting a force on a surface of the movable member.

18. A method of filtering a liquid, which comprises passing the liquid through the plurality of filters of the multi-well filtration apparatus of claim 11.

19. A method of filtering a liquid, which comprises passing the liquid through the filter(s) of the multi-well filtration apparatus of claim 11.

20. A filtration apparatus, which comprises:

(a) a housing;

(b) a member that contains at least one filter; and (c) at least one pivotable member having a guiding surface and being capable of pivoting in first and second opposing directions, the at least one pivotable member being attached to the housing and pivoting in a first direction in response to a force applied to the guiding surface by the member that contains at least one filter and pivoting in a second direction to instantaneously secure the member that has at least one filter to the filtration apparatus when the force is no longer applied to the guiding surface.

* * * * *

UNITED STATES PATENT AND TRADEMARK OFFICE

CERTIFICATE OF CORRECTION

PATENT NO. : 5,205,989

DATED : April 27, 1993

INVENTOR(S) : James E. Aysta

It is certified that error appears in the above-identified patent and that said Letters Patent is hereby corrected as shown below:

Col. 2, line 28, "drawing" should be --drawings--.

Col. 6, line 12, after "have" insert --a filter--.

Col. 6, line 14, delete "filtratic" and replace with --filtration plate--.

Col. 6, line 16, "permitti" should be --permitting the--.

Col. 6, line 18, before "against" insert --plate--.

Col. 6, line 41, "fores" should be --forces--.

Cols. 6-7, lines 68 and 1, "opposite" should be --opposing--.

Signed and Sealed this

Fourth Day of January, 1994

Attest:

BRUCE LEHMAN

*Attesting Officer*

*Commissioner of Patents and Trademarks*